J. M. & J. L. JONES.

Hand-Vehicles.

No. 5,992. Reissued July 28, 1874.

WITNESSES.

J. William Garner,

Frank Clancy

INVENTORS.

Jos. M. Jones

Jas. L. Jones per

F. A. Lehmann, Atty.

THE GRAPHIC CO. PHOTO-LITH. 39 & 41 PARK PLACE, N.Y.

UNITED STATES PATENT OFFICE

JOSEPH M. JONES, OF PARIS, AND JAMES L. JONES, OF LEXINGTON, KY.

IMPROVEMENT IN HAND-VEHICLES.

Specification forming part of Letters Patent No. 143,767, dated October 21, 1873; reissue No. 5,992, dated July 28, 1874; application filed July 9, 1874.

*To all whom it may concern:*

Be it known that we, JOSEPH M. JONES, of Paris, in the county of Bourbon, and JAMES L. JONES, of Lexington, in the county of Fayette, and State of Kentucky, have invented certain new and useful Improvements in Wheelbarrows; and do hereby declare that the following is a full, clear, and exact description thereof, that will enable others skilled in the art to which it appertains to make and use the same, reference being had to the accompanying drawings, and to the letters of reference marked thereon, which form part of this specification.

The nature of our invention relates to an improvement in wheelbarrows, and other similar vehicles to be operated by hand; and it consists in making the wheel movable, so that it can be shifted back and forth, for the purpose of preventing the vehicle from tilting while being loaded, and of transferring the weight of the load from the front end of the bed to a point near the center directly upon the wheel, whereby the operator is enabled to operate the vehicle by simply pushing forward, and without having to lift or carry so much of the load, as will be more fully described hereafter.

Figure 1:
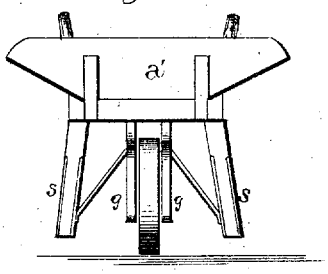
Figure 2:
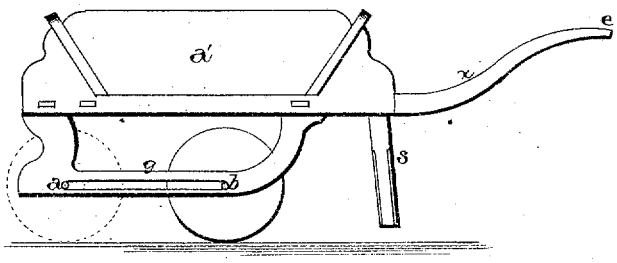

Figure 1 represents an end view of our invention. Fig. 2 is a side elevation of the same.

*a'* represents an ordinary wheelbarrow, which is provided with handles, which are curved upward from *x* to *e*, as shown in Fig. 2, and with the legs S. Secured to the under side of the bed are two parallel guides, *g*, each of which has a horizontal slot cut in it, which extends from a point just under the front end of the bed back to a point under or near the center of the bed. In these slots are placed the journals of the wheel, so that the wheel can be shifted back and forth the entire length of the slot. While the wheel is at the point *b*, under or near the center of the bed, the bulk of the load comes directly upon the wheel, so that the operator has simply to push the vehicle forward, without having to lift and carry so much of the weight. When the wheel is at the point *a*, under the forward end of the bed, the vehicle is not so liable to upset while being loaded, but rests firmly upon this wheel and the legs S at the other end. Though slots are here shown in the guides, other mechanical devices may be used in their place and accomplish the same result.

Having thus described our invention, we claim—

In a hand-vehicle, the axle combined with hangers, so that the wheel or wheels can be shifted back and forth from the forward end, as set forth.

In testimony that we claim the foregoing we have hereunto set our hands.

JOSEPH MATTHIAS JONES.
JAMES LAWRENCE JONES.

Witnesses:

BRENT R. HUTCHCRAFT,
W. T. JONES.